US012246580B2

(12) United States Patent
Ogaki et al.

(10) Patent No.: US 12,246,580 B2
(45) Date of Patent: Mar. 11, 2025

(54) HEATING CONTROL METHOD FOR VEHICLE

(71) Applicant: HONDA MOTOR CO., LTD., Tokyo (JP)

(72) Inventors: Toru Ogaki, Tokyo (JP); Ken Hayasaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 46 days.

(21) Appl. No.: 18/238,876

(22) Filed: Aug. 28, 2023

(65) Prior Publication Data

US 2024/0066954 A1 Feb. 29, 2024

(30) Foreign Application Priority Data

Aug. 31, 2022 (JP) .................................. 2022-137850

(51) Int. Cl.
*B60H 1/00* (2006.01)
*B60H 1/22* (2006.01)
(Continued)

(52) U.S. Cl.
CPC ..... *B60H 1/00899* (2013.01); *B60H 1/00278* (2013.01); *B60H 1/00321* (2013.01);
(Continued)

(58) Field of Classification Search
None
See application file for complete search history.

(56) References Cited

U.S. PATENT DOCUMENTS

2014/0060102 A1* 3/2014 Nemesh ............. B60H 1/00278
62/238.7
2014/0208775 A1* 7/2014 Styles ................... F25B 29/003
62/56

(Continued)

FOREIGN PATENT DOCUMENTS

JP 2020-179839 A 11/2020
JP 2022-010766 A 1/2022

OTHER PUBLICATIONS

May 14, 2024, Translation of Japanese Office Action issued for related JP Application No. 2022-137850.
May 14, 2024, Japanese Office Action issued for related JP Application No. 2022-137850.

(Continued)

*Primary Examiner* — Edelmira Bosques
*Assistant Examiner* — Deepak A Deean
(74) *Attorney, Agent, or Firm* — Paratus Law Group, PLLC

(57) ABSTRACT

A vehicle has a battery and an air conditioner heating a vehicle compartment. The vehicle travels by electric power of the battery. An operation mode in which heating of the vehicle compartment is performed includes an outside-air-heat absorption mode in which the vehicle compartment is heated by absorbing heat from outside air without absorbing heat from the battery, and a battery-heat absorption mode in which the vehicle compartment is heated by absorbing heat from at least the battery. The heating control method for the vehicle includes, after an operation of the air conditioner is started in a state where the battery-heat absorption mode is selected, switching from the battery-heat absorption mode to the outside-air-heat absorption mode, or reducing an amount of heat absorbed from the battery in the battery-heat absorption mode, based on a predetermined condition.

4 Claims, 9 Drawing Sheets

(51) Int. Cl.
    *B60L 1/02*       (2006.01)
    *B60L 58/26*     (2019.01)
    *B60L 58/27*     (2019.01)
    *B60L 58/10*     (2019.01)
    *B60L 58/12*     (2019.01)
    *B60L 58/24*     (2019.01)

(52) U.S. Cl.
    CPC ..... *B60H 1/00392* (2013.01); *B60H 1/00921* (2013.01); *B60H 1/22* (2013.01); *B60L 1/02* (2013.01); *B60L 58/26* (2019.02); *B60L 58/27* (2019.02); *B60H 2001/00949* (2013.01); *B60L 58/10* (2019.02); *B60L 58/12* (2019.02); *B60L 58/24* (2019.02); *B60L 2240/34* (2013.01); *B60L 2240/545* (2013.01)

(56) References Cited

U.S. PATENT DOCUMENTS

| | | | |
|---|---|---|---|
| 2015/0104687 A1* | 4/2015 | Morimoto | B60L 3/0046 |
| | | | 429/120 |
| 2020/0047586 A1* | 2/2020 | Gonze | B60H 1/00385 |
| 2020/0338950 A1* | 10/2020 | Kim | B60H 1/00921 |
| 2021/0156296 A1* | 5/2021 | Xi | F01P 7/165 |
| 2023/0091458 A1* | 3/2023 | Suzuki | B60H 1/3204 |
| | | | 62/132 |

OTHER PUBLICATIONS

Aug. 20, 2024, Japanese Decision to Grant a Patent issued for related JP Application No. 2022-137850.

* cited by examiner

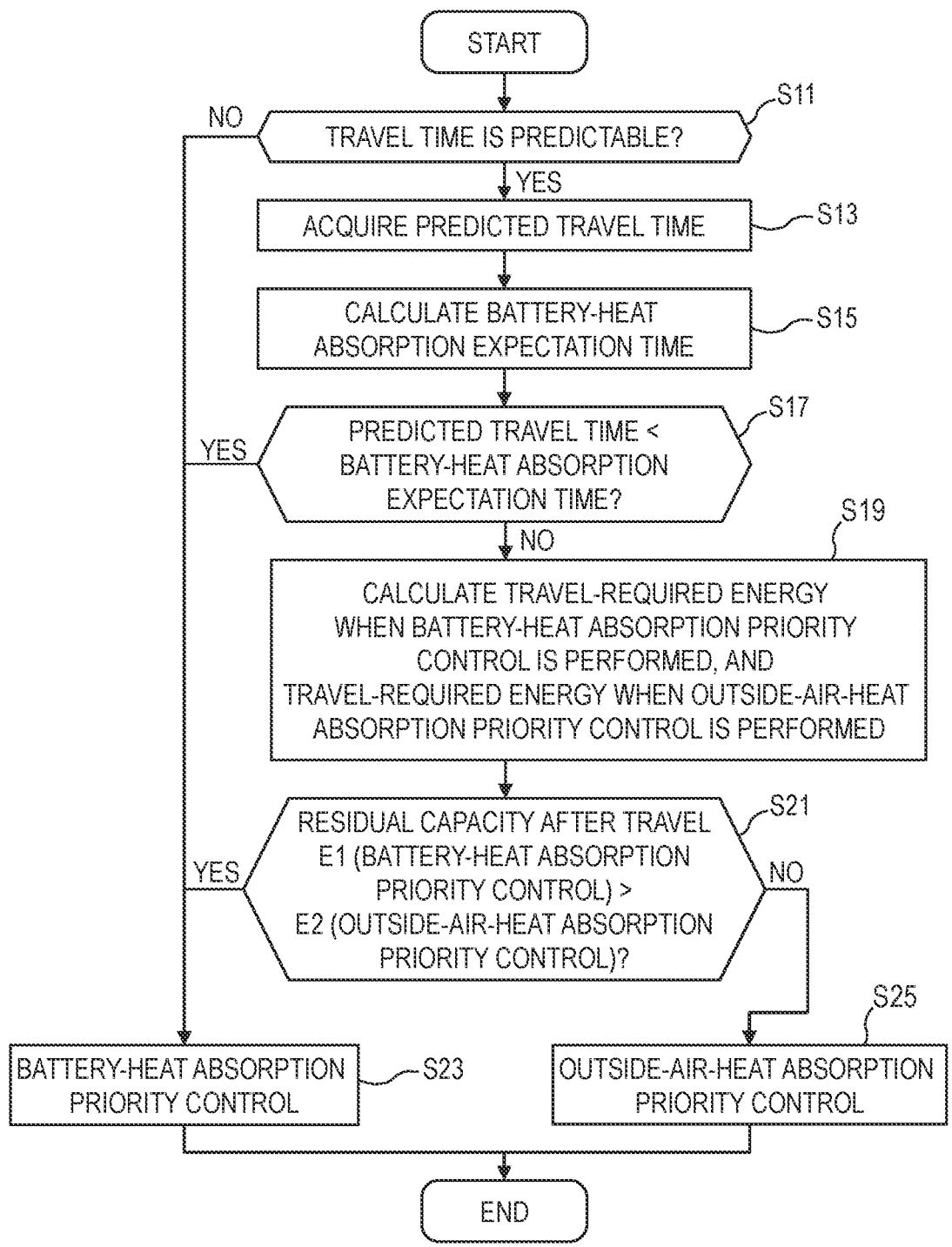

HEATING CONTROL METHOD FOR VEHICLE

CROSS-REFERENCE TO RELATED APPLICATIONS

This application claims priority from Japanese Patent Application No. 2022-137850 filed on Aug. 31, 2022, the entire subject-matter of which is incorporated herein by reference.

TECHNICAL FIELD

The present disclosure relates to a heating control method for a vehicle.

BACKGROUND ART

In recent years, researches and developments have been conducted on a secondary battery (hereinafter, also referred to as a battery) that contributes to an increase in energy efficiency in order to allow more users to access affordable, reliable, sustainable, and advanced energy. The battery is mounted on, for example, an electric vehicle and serves as an electric power source for an electric motor as a drive source and various devices.

Some air conditioners mounted on a vehicle absorb heat from outside air (that is, heat-pumps) to heat a vehicle compartment. In addition, such an air conditioner may absorb heat from a battery in addition to heat absorbed from the outside air. For example, JP2020-179839A discloses a vehicle heat pump system which enables to use heat stored in a battery during a charge of the battery, to heat a vehicle compartment.

An air conditioner that absorbs heat from a battery can efficiently heat a vehicle compartment, and thus it can be expected to improve an electricity cost of a vehicle. However, if the heat absorption from the battery is continued, a battery temperature may decrease and an effective capacity of the battery may decrease. Thus, the heat absorption from the battery might lead a decrease in a cruising distance of the vehicle. Therefore, it is desirable to appropriately control the heat absorption from the battery, when the vehicle compartment is heated by using the heat absorption from the battery, to achieve a balance between the electricity cost of the vehicle and the cruising distance of the vehicle.

SUMMARY OF INVENTION

The present disclosure provides a heating control method for a vehicle, which enables to achieve a balance between an electricity cost in the vehicle and a cruising distance of the vehicle.

An aspect of the present disclosure relates to a heating control method for a vehicle including a battery and an air conditioner that enables to heat a vehicle compartment, the vehicle being capable of traveling by electric power of the battery, in which an operation mode in which heating of the vehicle compartment is performed includes:
an outside-air-heat absorption mode in which the vehicle compartment is heated by absorbing heat from outside air without absorbing heat from the battery; and
a battery-heat absorption mode in which the vehicle compartment is heated by absorbing heat from at least the battery, and the heating control method includes:
after an operation of the air conditioner is started in a state where the battery-heat absorption mode is selected, switching from the battery-heat absorption mode to the outside-air-heat absorption mode, or reducing an amount of heat absorbed from the battery in the battery-heat absorption mode, based on a predetermined condition.

According to the present disclosure, it is possible to achieve a balance between an electricity cost of a vehicle and a cruising distance of the vehicle.

BRIEF DESCRIPTION OF DRAWINGS

FIG. 9 shows a control flow for determining which one of the battery-heat absorption priority control and the outside-air-heat absorption priority control is to be performed before the vehicle V starts traveling.

DESCRIPTION OF EMBODIMENTS

[Vehicle]

Figure 1:
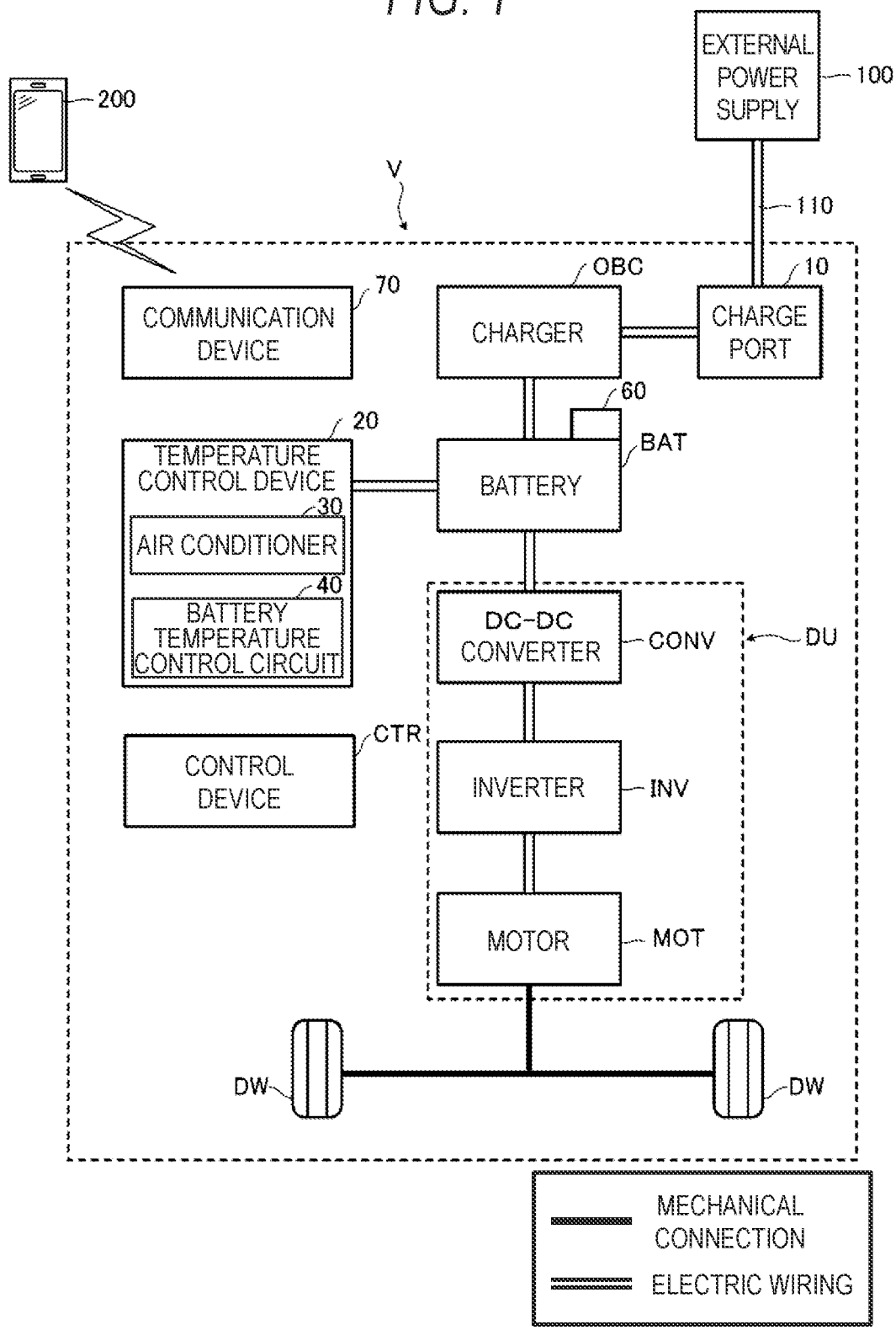
FIG. 1 is a block diagram showing an example of a schematic configuration of a vehicle V.

A vehicle V in the present embodiment is, for example, an electric vehicle such as a plug-in hybrid vehicle or an electric automobile, includes a battery BAT capable of storing electric power from an external power supply 100 provided in a charging station, a home, or the like as shown in FIG. 1. The vehicle is capable of traveling on the electric power stored in the battery BAT. The battery BAT is implemented by stacking a plurality of battery cells (not shown), and is, for example, a lithium ion battery or a nickel hydrogen battery. In addition, the battery BAT is provided with a temperature sensor 60 that detects a temperature of the battery BAT (hereinafter also referred to as a battery temperature). In FIG. 1, a thick solid line indicates mechanical connection, and a double line indicates electric wiring. In addition, the configuration shown in FIG. 1 is an example, and a part of the configuration may be omitted, or another configuration may be added.

The vehicle V is provided with a charge port 10 and a charger OBC (on-board charger) disposed between the charge port 10 and the battery BAT. When a charge plug of a charge cable 110 of the external power supply 100 is connected (plugged in) to the charge port 10, the charger OBC converts a current introduced from the external power supply 100 via the charge port 10, for example, converts an AC during normal charge into a DC, and outputs the converted DC to the battery BAT. In this way, the battery BAT stores electric power supplied from the external power supply 100. The configuration for charging the battery BAT by the external power supply 100 is not limited thereto. For example, the battery BAT may be charged by a configuration in which a power receiving coil or the like capable of receiving electric power transmitted from the external power supply 100 in a non-contact manner is provided in the vehicle V.

The vehicle V includes a drive unit DU a temperature control device 20, a control device CTR, and a communication device 70.

The drive unit DUT includes a DC-DC converter CONV, an inverter INV, and a motor MOT. The DC-DC converter CONV boosts electric power supplied from the battery BAT and outputs the boosted electric power to the inverter INV. The inverter INV converts a DC supplied from the DC-DC converter CONV into an AC and outputs the AC to the motor MOT. The motor MOT is, for example, a three-phase AC motor, and is driven by electric power supplied from the battery BAT via the DC-DC converter CONV and the inverter INV An output of the motor MOT is transmitted to drive wheels DW of the vehicle V, and thus the vehicle V travels.

The control device CTR controls the charger OBC, the battery BAT, the drive unit DU, the temperature control device 20, and the communication device 70. In addition, the control device CTR also controls a battery heater ECH1 and a heating heater ECH2 to be described later. The control device CTR is implemented by an electronic control unit (ECU) including a processor, a memory, an interface, and the like. The control device CTR may be implemented by a plurality of control devices, that is, the control device may be provided for each of the above-described control objects.

The communication device 70 includes a wireless module for connecting to a cellular network or a Wi-Fi network. The communication device 70 is a communication interface that communicates, via a network such as the Internet or Ethernet, with a user terminal 200 (for example, a smartphone or a tablet terminal) operated by a user of the vehicle V.

The communication device 70 cooperates with schedule information on the vehicle V registered in advance by the user in the user terminal 200. The control device CTR acquires the schedule information on the vehicle V via the communication device 70. Then, the control device CTR acquires a start time of the vehicle V based on the schedule information. Here, the start time of the vehicle V includes a time when the vehicle V starts and a pre-air-conditioning start time when an operation of an air conditioner is started before the start. When the schedule information on the vehicle V is stored in an external server different from the user terminal 200, the communication device 70 may communicate with the external server via a network, and the control device CTR may acquire the schedule information on the vehicle V via the communication device 70 and acquire the start time of the vehicle V based on the schedule information.

[Temperature Control Device]

Figure 2:
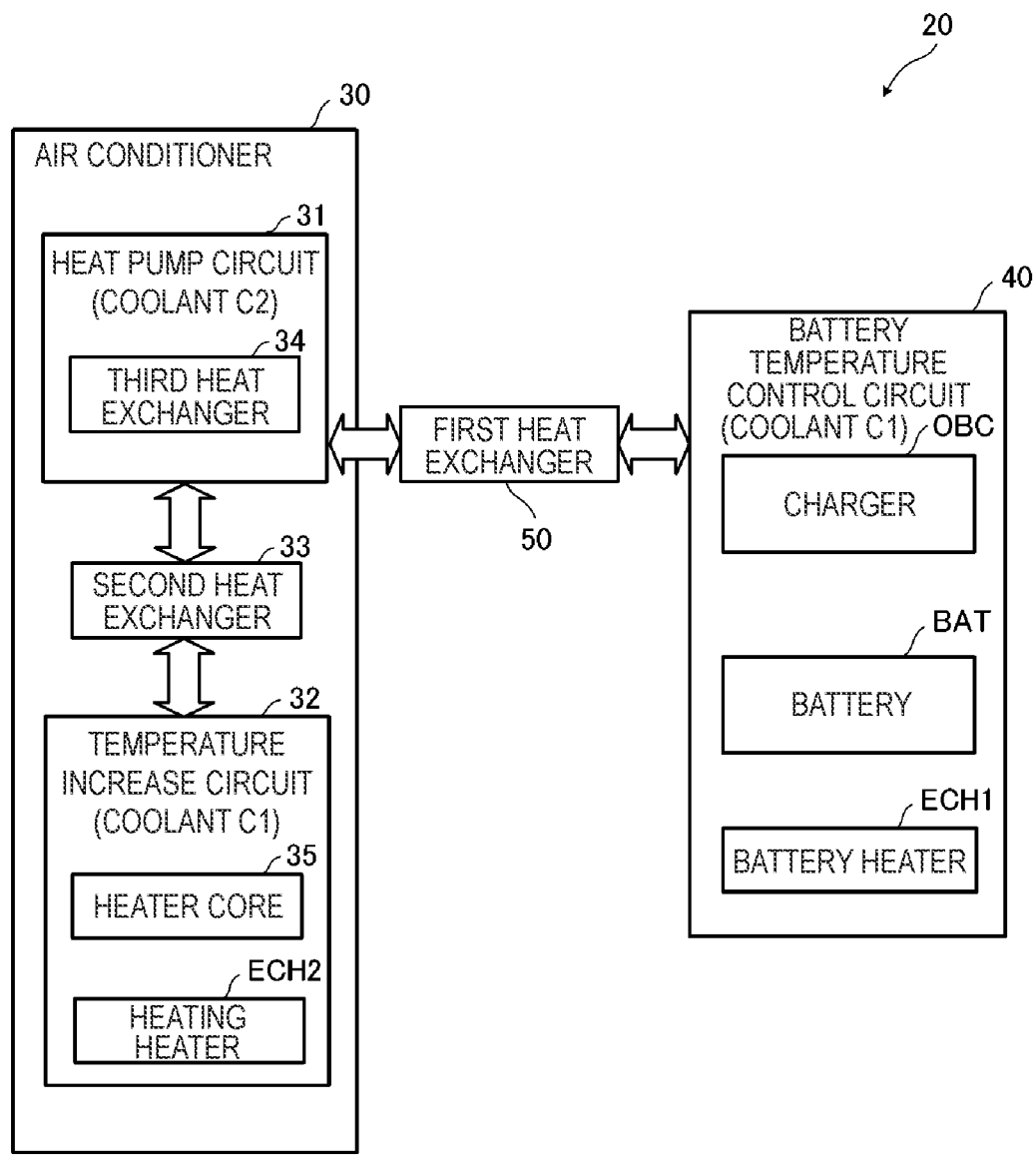
FIG. 2 shows a configuration of a temperature control device 20.

As shown in FIG. 2, the temperature control device 20 includes an air conditioner 30 that heats or cools a vehicle compartment, a battery temperature control circuit 40 that warms or cools down the battery BAT, and a first heat exchanger 50 that performs heat exchange between a heat pump circuit 31 of the air conditioner 30 and the battery temperature control circuit 40.

[Battery Temperature Control Circuit]

A liquid coolant C1 (for example, water) circulates inside the battery temperature control circuit 40, and heat exchange is performed between the battery BAT and the charger OBC.

Figure 3:
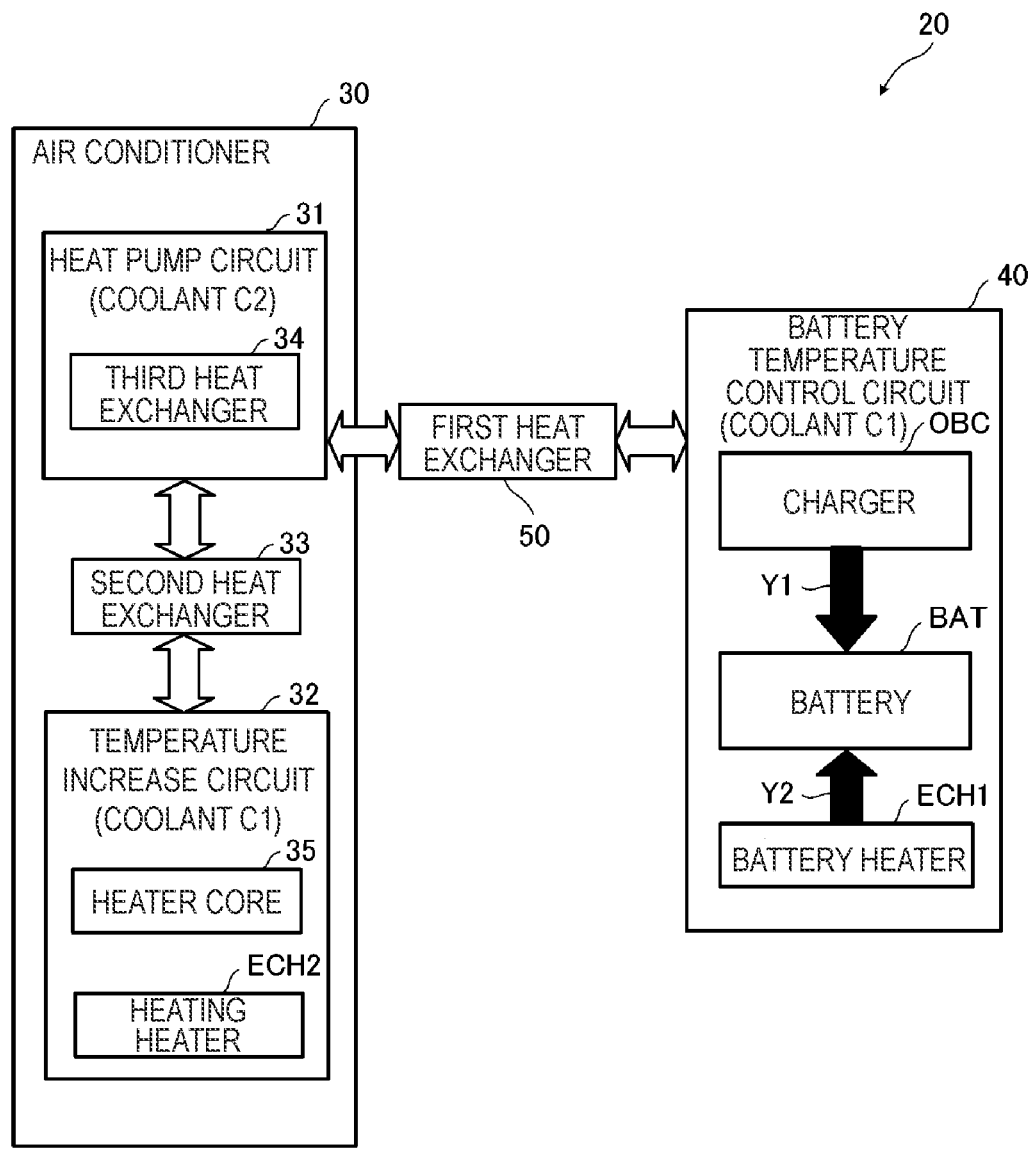
FIG. 3 shows a flow of heat stored in a battery BAT before heating a vehicle compartment.

Specifically, in the battery temperature control circuit 40, when the battery BAT is charged with the electric power from the external power supply 100 before the start of the vehicle V, the charger OBC generates heat and has a high temperature. The charger OBC performs heat exchange with the coolant C1 flowing through the battery temperature control circuit 40, the charger OBC is cooled down, and the coolant C1 is warmed. The warmed coolant C1 circulates through the battery temperature control circuit 40 to perform heat exchange with the battery BAT, thereby warming the battery BAT. A black arrow Y1 shown in FIG. 3 indicates transfer of heat from the charger OBC to the battery BAT. In this way, the battery BAT stores heat from the charger OBC via the coolant C1 during charging by the external power supply 100.

The battery temperature control circuit 40 is provided with the battery heater ECH1. The battery heater ECH1 is, for example, an electric heater (electric coolant heater), and operates by electric power from the external power supply 100 when the external power supply 100 is connected, and operates by electric power from the battery BAT when the external power supply 100 is not connected. Specifically, the coolant C1 is warmed by the battery heater ECH1, and the warmed coolant C1 performs heat exchange with the battery BAT to warm the battery BAT. A black arrow Y2 shown in FIG. 3 indicates transfer of heat from the battery heater ECH1 to the battery BAT. In this way, the battery BAT stores the heat from the battery heater ECH1 via the coolant C1.

Further, the battery BAT generates heat by itself when being charged by the external power supply 100, and stores the heat generated by itself.

Since the battery BAT has a large thermal capacity and easily stores heat, as described above, the charge plug coupled to the external power supply 100 is connected to the vehicle V after the use of the vehicle V until the next use of the vehicle V to charge the battery BAT, and thus the heat from the charger OBC, the heat from the batter heater ECH1, and the heat generated by the battery BAT itself are stored in the battery BAT.

[Air Conditioner]

The air conditioner 30 includes the heat pump circuit 31, a temperature increase circuit 32, and a second heat exchanger 33 that performs heat exchange between the heat pump circuit 31 and the temperature increase circuit 32. The heat pump circuit 31 includes a refrigeration cycle including a compressor, a condenser, an expansion valve, an evaporator, and the like, and a liquid coolant C2 (for example, an air-conditioning coolant) flows therein. The condenser (hereinafter, referred to as a third heat exchanger 34) of the heat pump circuit 31 is exposed to outside air, and is capable of absorbing heat (that is, heat-pumping) from the outside air under a low-temperature environment when heating the vehicle compartment. A black arrow Y3 shown in FIGS. 4 and 5 indicates transfer of heat from the outside air to the third heat exchanger 34.

The liquid coolant C1 (for example, water) flows inside the temperature increase circuit 32. The coolant in the temperature increase circuit 32 and the coolant in the battery temperature control circuit 40 are both the coolant C1 and are common. The coolant C1 in the temperature increase circuit 32 performs heat exchange with the coolant C2 in the heat pump circuit 31 via the second heat exchanger 33, and thus a temperature thereof is increased. A black arrow Y4 shown in FIGS. 4 and 5 indicates transfer of heat from the third heat exchanger 34 to the temperature increase circuit 32 via the second heat exchanger 33.

The heating heater ECH2 is provided in the temperature increase circuit 32, and the temperature of the coolant C1 in the temperature increase circuit 32 is also increased by heat from the heating heater ECH2. The heating heater ECH2 is, for example, an electric heater (electric coolant heater). A black arrow Y5 shown in FIGS. 4 and 5 indicates transfer of heat from the heating heater ECH2 to a heater core 35.

The temperature of the coolant C1 in the temperature increase circuit 32 is increased by heat transferred from the heat pump circuit 31 to the temperature increase circuit 32 via the second heat exchanger 33 and heat from the heating heater ECH2, and heat exchange is performed with conditioned air in the heater core 35 to heat the vehicle compartment.

[Heating Mode]
(Battery-Heat Absorption Mode)

Figure 4:
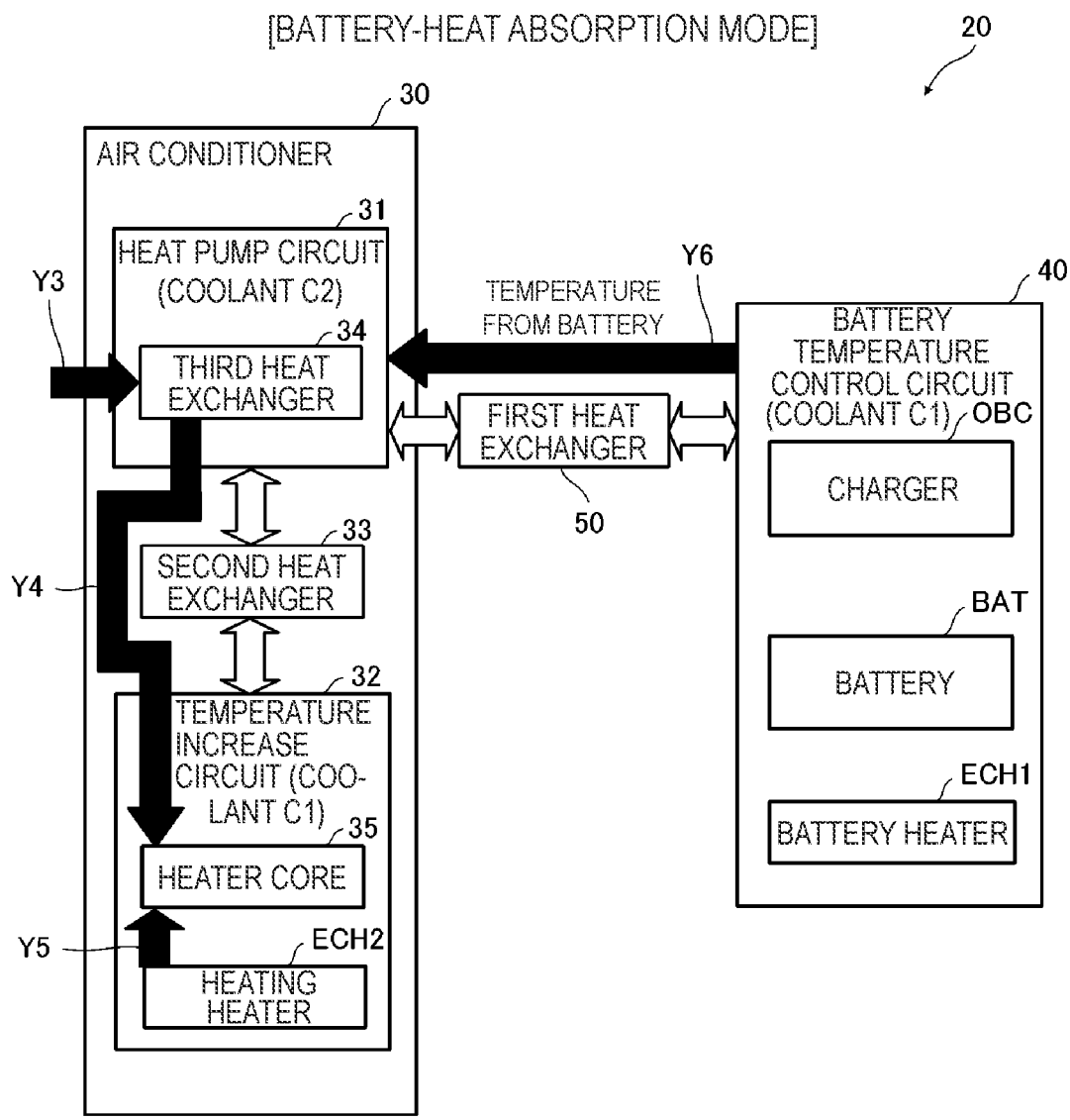
FIG. 4 shows a flow of heat when heating the vehicle compartment in a battery-heat absorption mode.

As described above, the first heat exchanger 50 enabling heat exchange between the coolant C1 and the coolant C2 is provided between the heat pump circuit 31 and the battery temperature control circuit 40. Therefore, heat (arrow Y1 in FIG. 3) from the charger OBC during charge, heat (arrow Y2 in FIG. 3) from the battery heater ECH1, and heat (not shown) stored in the battery BAT by self-heat-generation of the battery BAT during charge are transmitted to the heat pump circuit 31 via the first heat exchanger 50. A black arrow Y6 shown in FIG. 4 indicates transfer of heat from the battery temperature control circuit 40 to the heat pump circuit 31. Then, the heat (arrow Y6 in FIG. 4) from the battery BAT is transmitted to the temperature increase circuit 32 via the second heat exchanger 33 together with heat (arrow Y3 in FIG. 4) from the outside air, and heat (arrow Y5 in FIG. 4) from the heating heater ECH2 is applied to heat the vehicle compartment. That is, in this heating mode, the heat stored in the battery BAT is absorbed and used to heat the vehicle compartment in addition to outside-air-heat absorption. Hereinafter, heat absorption from the battery BAT is also referred to as battery-heat absorption, and an operation mode in which heating of the vehicle compartment is performed by battery-heat absorption is also referred to as a battery-heat absorption mode. FIG. 4 shows a flow of heat in the battery-heat absorption mode.

(Outside-Air-Heat Absorption Mode)

Figure 5:
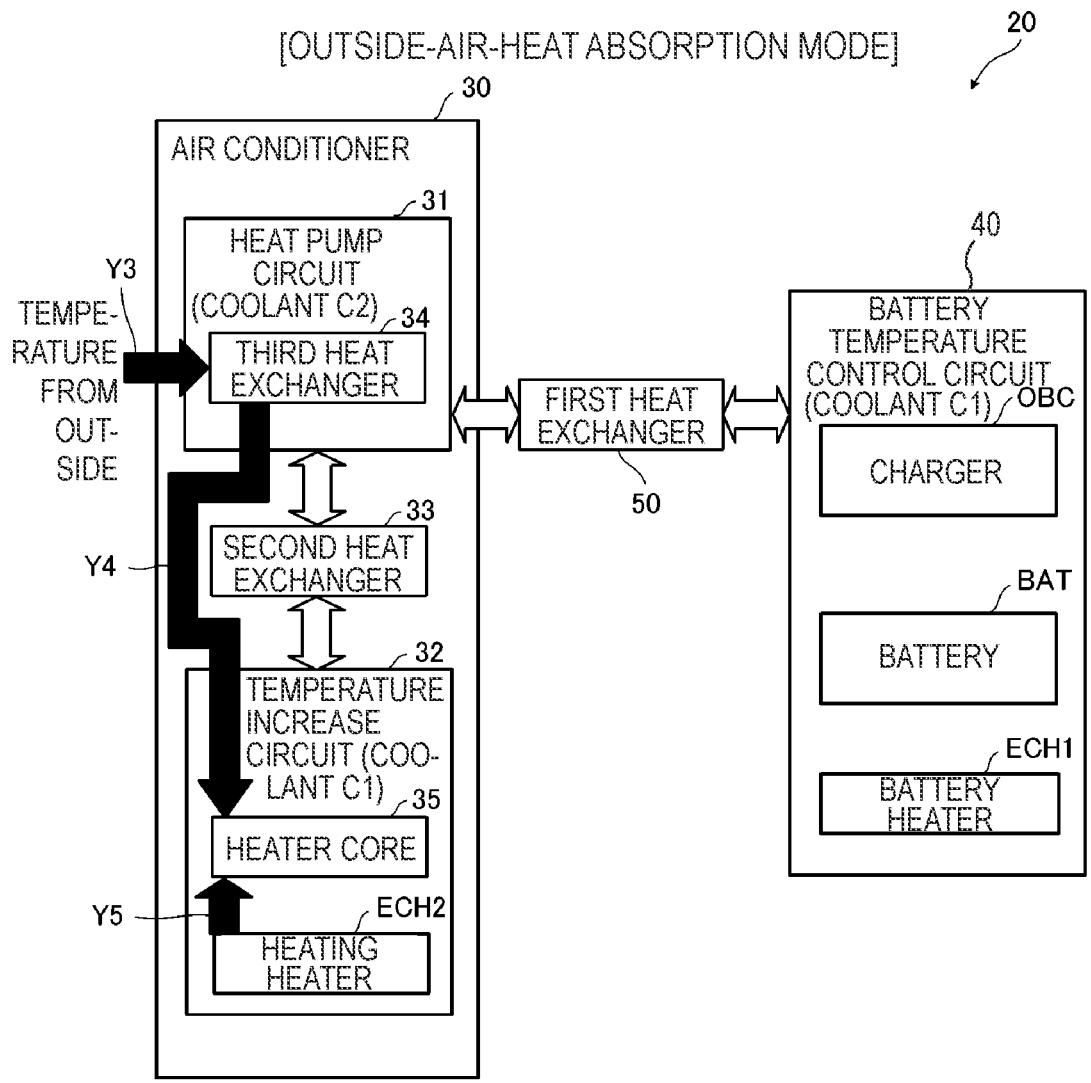
FIG. 5 shows a flow of heat when heating the vehicle compartment in an outside-air-heat absorption mode.

On the other hand, an operation mode in which the vehicle compartment is heated by absorbing heat from the outside air without using the heat stored in the battery BAT is also referred to as an outside-air-heat absorption mode. FIG. 5 shows a flow of heat in the outside-air-heat absorption mode.

Figure 6A:
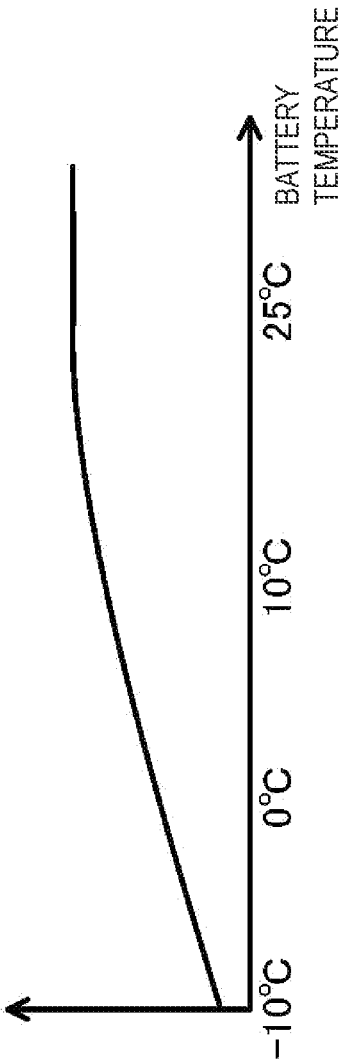
FIG. 6A is a graph showing a relationship between a battery temperature and an effective capacity of the battery BAT.

Here, FIG. 6A is a graph in which a vertical axis represents an effective capacity of the battery BAT and a horizontal axis represents the battery temperature. The effective capacity of the battery BAT refers to a capacity that can be used for operating the vehicle V in a charge capacity. As shown in FIG. 6A, when the battery temperature decreases, the effective capacity of the battery BAT decreases. In the present embodiment, by warming the battery BAT before the start of the vehicle V, the heat stored in the battery BAT can be used to heat the vehicle compartment as described above, and, in addition, the effective capacity of the battery BAT can be increased.

Figure 6B:
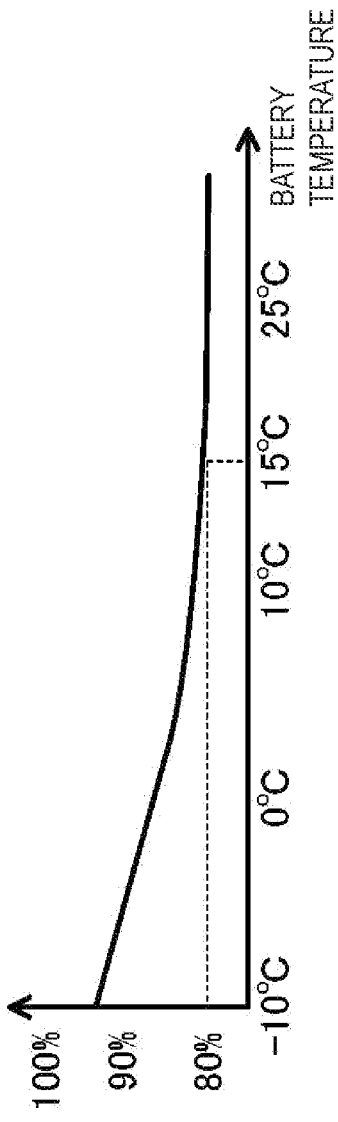
FIG. 6B is a graph showing a relationship between the battery temperature at a start time of the vehicle V and a ratio (expressed by a percentage) of an electric power amount P1 in the battery-heat absorption mode to an electric power amount P2 in the outside-air-heat absorption mode.

FIG. 6B is a graph in which a vertical axis represents a ratio (expressed by a percentage) of an electric power amount P1 in the battery-heat absorption mode to an electric power amount P2 in the outside-air-heat absorption mode, and a horizontal axis represents the battery temperature at the start of the vehicle V. The electric power amounts P1 and P2 are electric power amounts (that is, electricity costs) of the battery BAT consumed when the air conditioner 30 performs heating for a predetermined time (for example, 30 minutes). When the vertical axis is 100%, it means that the electric power amount P1 is equal to the electric power amount P2. When a value of the vertical axis is smaller than 100%, the electric power amount P1 is smaller than the electric power amount P2, that is, the battery-heat absorption mode is more efficient than the outside-air-heat absorption mode.

As shown in FIG. 6B, when the battery temperature at the start of the vehicle V is $-10°$ C. to $15°$ C., the electric power amount P1 in the battery-heat absorption mode is about 80% to 95% of the electric power amount P2 in the outside-air-heat absorption mode, and, when the battery temperature is $15°$ C. or higher, the electric power amount P1 in the battery-heat absorption mode converges to about 80% of the electric power amount P2 in the outside-air-heat absorption mode. In this way, in the battery-heat absorption mode, the electric power consumption amount of the battery BAT used for heating the vehicle compartment is smaller than that in the outside-air-heat absorption mode. Accordingly, in the battery-heat absorption mode, it is possible to reduce a decrease in a charge amount (also referred to as a state of charge (SOC)) of the battery BAT due to heating, and to improve a cruising distance of the vehicle V.

[Heating Control Method]

Next, a heating control method according to the present embodiment will be described.

Figure 7:
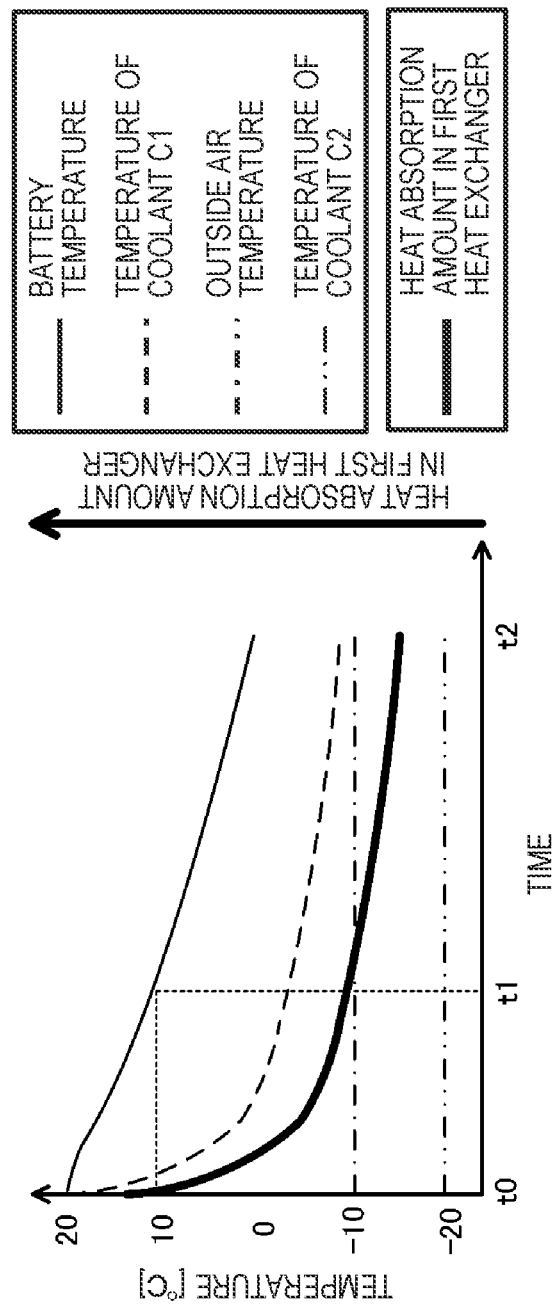
FIG. 7 shows a graph showing changes over time in a battery temperature, a temperature of a coolant C1 in a battery temperature control circuit 40, a temperature of a coolant C2 in a heat pump circuit 31, and an outside air temperature in the battery-heat absorption mode, and a graph showing a change over time in an amount of heat absorbed from the battery BAT by the coolant C2 in a first heat exchanger 50.

FIG. 7 is a graph showing changes over time in the battery temperature, the temperature of the coolant C2 in the heat pump circuit 31, the temperature of the coolant C1 in the battery temperature control circuit 40, and the outside air temperature. In addition, FIG. 7 shows a graph representing a change over time in an amount of heat absorbed by the coolant C2 in the heat pump circuit 31 from the coolant C1 in the battery temperature control circuit 40 in the first heat exchanger 50. FIG. 7 shows a case where heating is continued in the battery-heat absorption mode from a time t0 when the air conditioner 30 starts an operation to a time t2 when the operation is completed. In FIG. 7, the outside air temperature is a constant value, that is, $-10°$ C. from the time t0 to the time t2. In addition, the temperature of the coolant C2 is a temperature immediately before receiving the heat from the battery BAT in the first heat exchanger 50, and is lower than the battery temperature. In FIG. 7, the temperature of the coolant C2 has a constant value, that is, $-20°$ C. from the time t0 to the time t2.

When heating is performed in the battery-heat absorption mode from the time t0, the heat stored in the battery BAT is transferred to the heat pump circuit 31 via the first heat exchanger 50 (arrow Y6 in FIG. 4). Accordingly, the battery temperature and the temperature of the coolant C1 in the battery temperature control circuit 40 gradually decrease from 20° C. at the time t0. As the temperature of the coolant C1 decreases, a temperature difference with the temperature of the coolant C2 in the heat pump circuit 31 decreases, and an amount of heat absorbed in the first heat exchanger 50 gradually decreases.

As shown in FIGS. 6A and 6B, when the battery temperature is high, the effective capacity of the battery BAT is high, and heating efficiency by battery-heat absorption is favorable. However, when the battery temperature decreases as the heating is continued in the battery-heat absorption mode, the heating efficiency by the battery-heat absorption deteriorates, and the cruising distance of the vehicle V decreases as the effective capacity of the battery BAT decreases, Thus, heating in the battery-heat absorption mode has favorable heating efficiency over a short time, the heating efficiency gradually deteriorates over a long time and, further, the cruising distance may decrease. Therefore, it may not be preferable to continue the heating of the vehicle V in the battery-heat absorption mode from the time t0 to the time t2.

Therefore, after the operation of the air conditioner 30 is started in a state where the battery-heat absorption mode is selected, the control device CTR switches the mode from the battery-heat absorption mode to the outside-air-heat absorption mode or reduces the amount of heat absorbed from the battery BAT in the battery-heat absorption mode, based on a predetermined condition.

Specifically, as shown in FIG. 7, the control device CTR selects the battery-heat absorption mode at the time t0 and then starts the operation of the air conditioner 30. Then, at a time t1, the control device CTR switches the mode from the battery-heat absorption mode to the outside-air-heat absorption mode, or reduces the amount of heat absorbed from the battery BAT in the battery-heat absorption mode. Here, the time t1 is a time when an amount of decrease in the battery temperature since the start of the operation of the air conditioner is equal to or larger than a predetermined temperature decrease amount (for example, when the battery temperature decreases by 10° C. or more).

More specifically, before the time t1, the air conditioner 30 heats the vehicle compartment by using at least heat absorbed from the battery BAT. Accordingly, since it is possible to perform heating by efficient battery-heat absorption in the state where the battery temperature is relatively high, the electricity cost of the vehicle V is improved. Before the time t1, only the battery-heat absorption may be performed, or the battery-heat absorption may be performed together with outside-air-heat absorption.

After the time 11, the air conditioner 30 switches the mode to the outside-air-heat absorption mode to perform heating by absorbing heat from the outside air without absorbing heat from the battery BAT or maintains the battery-heat absorption mode while reducing the amount of heat absorbed from the battery BAT to less than that before the time t1 and increasing an amount of heat absorbed from the outside air instead to perform heating. Accordingly, it is possible to prevent the heating in the battery-heat absorption mode from continuing in a state where the heating efficiency by the battery-heat absorption deteriorates when the battery temperature decreases to a certain extent. Thus, a further decrease in the battery temperature is prevented, so it is possible to prevent a decrease in the effective capacity of the battery BAT, that is, it is possible to prevent a decrease in the cruising distance.

By appropriately controlling the heat absorption from the battery BAT as described above, it is possible to achieve a balance between the electricity cost and the cruising distance of the vehicle V.

Here, the predetermined temperature decrease amount is preferably determined based on a decrease amount of the effective capacity of the battery BAT due to the decrease in the battery temperature. For example, the predetermined temperature decrease amount is determined such that a decrease in the effective capacity from the time t0 is 10% Accordingly, it is possible to prevent an excessive decrease in the cruising distance of the vehicle V caused by the decrease in the effective capacity of the battery BAT due to the decrease in the battery temperature.

The control device CTR may switch the mode from the battery-heat absorption mode to the outside-air-heat absorption mode or may reduce the amount of heat absorbed from the battery BAT in the battery-heat absorption mode when a predetermined time elapses since the start of the operation of the air conditioner 30. Specifically, the mode may be switched from the battery-heat absorption mode to the outside-air-heat absorption mode or the amount of heat absorbed from the battery BAT in the battery-heat absorption mode may be reduced at a time when a predetermined time (for example, 30 minutes) elapses from the time t0 when the operation of the air conditioner 30 is started. With such a configuration, it is possible to perform efficient heating by battery-heat absorption in an initial stage when the battery temperature is relatively high, and to prevent the heating in the battery-heat absorption mode from continuing in a state where the heating efficiency by battery-heat absorption deteriorates when the battery temperature is low after the initial stage.

The above-described control of battery-heat absorption can achieve a balance between the electricity cost and the cruising distance of the vehicle V However, for example, when the vehicle V is to travel for a long time, priority may be given to the cruising distance. In such a case, it may be favorable to perform heating by the outside-air-heat absorption mode instead of the battery-heat absorption mode since the start of the operation of the air conditioner 30. Thus, it is preferable that the control device CTR determines in which mode the air conditioner 30 is to be operated before the vehicle V starts traveling. In the following description, control under which the heating in the battery-heat absorption mode is performed during travel of the vehicle V is referred to as "battery-heat absorption priority control". In other words, the battery-heat absorption priority control includes control under which the vehicle compartment is heated in the battery-heat absorption mode at the start of the operation of the air conditioner 30 and then the mode is switched to the outside-air-heat absorption mode, and control under which the amount of heat absorbed from the battery BAT is reduced in the middle of heating the vehicle compartment in the battery-heat absorption mode. In addition, the control under which the heating in the outside-air-heat absorption mode is performed without in the battery-heat absorption mode during travel of the vehicle V is referred to as the "outside-air-heat absorption priority control".

Figure 8:
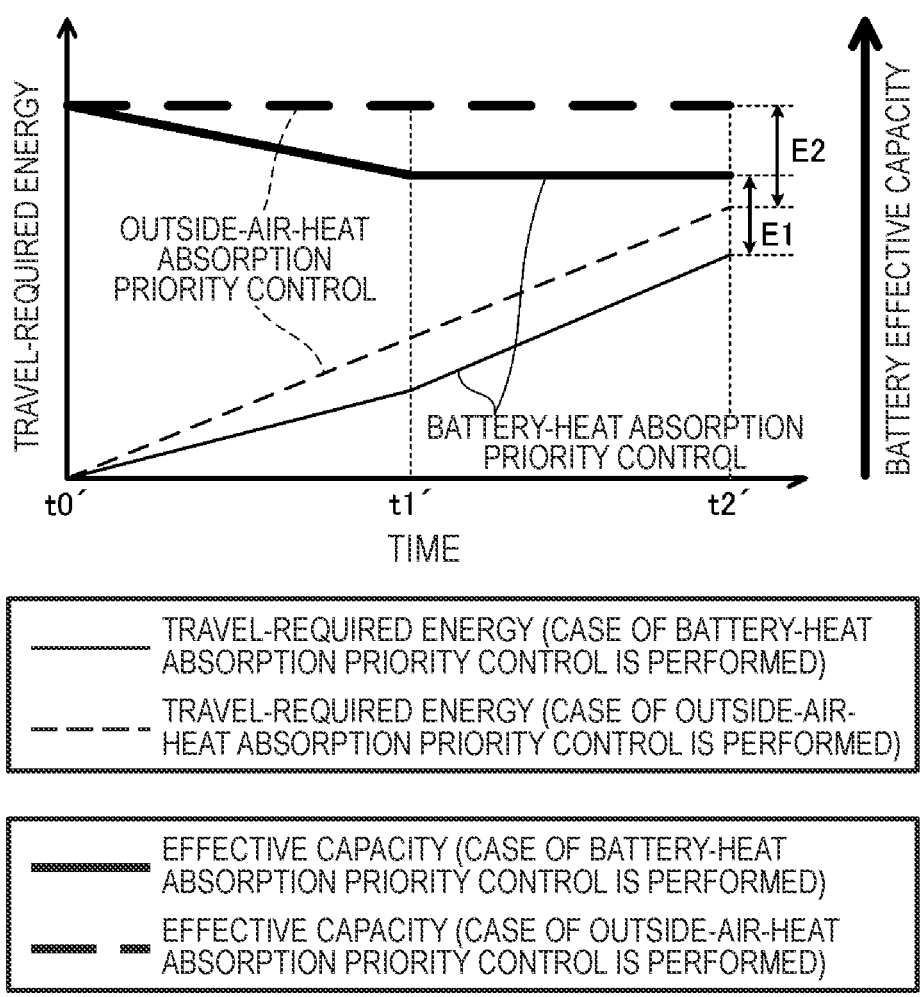
FIG. 8 is a graph showing a change over time in travel-required energy of the vehicle V and a change over time in the effective capacity of the battery BAT when battery-heat absorption priority control is performed, and a change over time in the travel-required energy of the vehicle V and a change over time in the effective capacity of the battery BAT when outside-air-heat absorption priority control is performed.

FIG. 8 is a graph showing a change over time in energy required for travel of the vehicle V (hereinafter, also referred to as travel-required energy) when the battery-heat absorption priority control is performed (thin solid line) and a change over time in the travel-required energy of the vehicle V when the outside-air-heat absorption priority control is performed (thin broken line). A time t0' is a time when the vehicle V is predicted to start traveling. A time t1' is a time when switching from the battery-heat absorption mode to the outside-air-heat absorption mode is predicted in consideration of the heating efficiency when the battery-heat absorption priority control is performed, and corresponds to the time t1 in FIG. 7. A time t2' is a time when completion of travel of the vehicle V is predicted.

FIG. 8 also shows a graph showing a change over time in the effective capacity of the battery BAT when the battery-heat absorption priority control is performed (thick solid line) and a change over time in the effective capacity of the battery BAT when the outside-air-heat absorption priority control is performed (thick broken line). To specifically describe the graph on the effective capacity, when the battery-heat absorption priority control is performed (thick solid line), the battery temperature decreases from the time t0' to the time t1' due to battery-heat absorption, and the effective capacity of the battery BAT decreases from the time t0' to the time t1'. The battery temperature is maintained without performing battery-heat absorption from the time t1' to the time t2', and the effective capacity of the battery BAT is maintained from the time t1' to the time t2'. When the battery-heat absorption priority control is performed, a difference E1 between the effective capacity of the battery BAT at the time t2' and the travel-required energy is energy (residual capacity) remaining in the battery BAT after the travel is completed. On the other hand, when the outside-air-heat absorption priority control is performed (thick broken line), the battery temperature is maintained from the time t0' to the time t2' since no battery-heat absorption is performed. Thus, the effective capacity of the battery BAT is maintained from the time t0' to the time t2'. When the outside-air-heat absorption priority control is performed, a difference E2 between the effective capacity of the battery BAT at the time t2' and the travel-required energy is the residual capacity of the battery BAT after the travel is completed.

As shown in FIG. 8, when the battery-heat absorption priority control is performed, the heating efficiency is favorable and the travel-required energy is small, whereas the effective capacity of the battery BAT is reduced, as compared to the case where the outside-air-heat absorption priority control is performed. Thus, the residual capacity E1 of the battery BAT when the battery-heat absorption priority control is performed may be smaller than the residual capacity E2 of the battery BAT when the outside-air-heat absorption priority control is performed (that is, E1<E2).

When it is predicted that the travel is of a relatively short time such that the travel of the vehicle V is completed before the time t1', the residual capacity of the battery BF at the time of completion of the travel is sufficiently large and the battery BAT does not run out of charge. Therefore, it is preferable that the control device CTR performs the battery-heat absorption priority control to travel in a manner that reduces the travel-required energy and improves the electricity cost. On the other hand, when it is predicted that the travel is of a relatively long time such that the travel of the vehicle V is completed at the time t2', it is preferable to prioritize the residual capacity of the battery BAT at the time of completion of the travel over traveling with a good electricity cost in order to avoid running out of charge. Thus, when travel for a relatively long time is predicted, as shown in the example in FIG. 8, in a case where the residual capacity E2 when performing the outside-air-heat absorption priority control is larger than the residual capacity E1 when performing the battery-heat absorption priority control, the control device CTR preferably performs the outside-air-heat absorption priority control without performing the battery-heat absorption priority control of the vehicle V from the time t0'.

Next, a control flow through which the control device CTR determines whether to perform the battery-heat absorption priority control or the outside-air-heat absorption priority control before the vehicle V starts traveling will be described with reference to FIG. 9.

First, the control device CTR determines whether a travel time of the vehicle V is predictable before the vehicle V starts traveling (step S11). Specifically, when the schedule information on the vehicle V is set by the user or a destination or a travel route of the vehicle V is set in a navigation device (not shown), the control device CTR determines that the travel time of the vehicle V is predictable.

When the travel time of the vehicle V is not predictable (step S11: NO), the control device CTR executes the battery-heat absorption priority control since the start of the operation of the air conditioner 30 (step S23).

On the other hand, when the travel time of the vehicle V is predictable (step S11: YES), the control device CTR acquires a predicted travel time based on the above-described schedule information or the like (step S13). Then, the control device CTR calculates a battery-heat absorption expectation time (step S15). Here, the battery-heat absorption expectation time is a time in which the heating efficiency by battery-heat absorption is high, and is a time from the time t0 to the time t1 in FIG. 7 or a time from the time t0' to the time t1' in FIG. 8. The control device CTR predicts a temperature change of the battery BAT based on a predetermined thermal model (a predetermined temperature map, a temperature calculation formula, or the like), and calculates the battery-heat absorption expectation time based on the prediction result.

Next, the control device CTR compares the predicted travel time with the battery-heat absorption expectation time (step S17). When the predicted travel time is less than the battery-heat absorption expectation time (step S17: YES), travel of a relatively short time is predicted. Since the heating efficiency by the battery-heat absorption is high in the travel of a relatively short time, the control device CTR executes the battery-heat absorption priority control since the start of the operation of the air conditioner 30 as described above (step S23).

When the predicted travel time is equal to or longer than the battery-heat absorption expectation time (step S17: NO), travel of a relatively long time is predicted. Then, the control device CTR calculates the travel-required energy in the case of performing the battery-heat absorption priority control and the travel-required energy in the case of performing the outside-air-heat absorption priority control as predicted travel-required energy from when the travel starts to when the travel completes (step S19).

Next, the control device CTR compares the residual capacity E1 of the battery BAT when the battery-heat absorption priority control is performed and the residual capacity E2 of the battery BAT when the outside-air-heat absorption priority control is performed based on the travel-required energy calculated in step S19 and the effective capacity of the battery BAT when the travel completes (step S21).

When the residual capacity E1 is larger than the residual capacity E2 (step S21: YES), the control device CTR executes the battery-heat absorption priority control since the start of the operation of the air conditioner (step S23).

On the other hand, when the residual capacity E2 is equal to or larger than the residual capacity E1 (step S21: NO), the control device CTR executes the outside-air-heat absorption priority control since the start of the operation of the air conditioner 30 (step S25). Accordingly, when travel of a relatively long time is predicted, it is possible to prioritize the residual capacity of the battery BAT at the time of the completion of travel, and it is possible to avoid running out of charge.

Although various embodiments have been described above with reference to the drawings, it is needless to say that the present invention is not limited to these examples. It is apparent that those skilled in the art can conceive of various modifications and changes within the scope described in the claims, and it is understood that such modifications and changes naturally fall within the technical scope of the present invention. In addition, respective constituent elements in the above embodiment may be freely combined without departing from the gist of the invention.

The battery temperature control circuit 40 may allow the coolant C1 to perform heat exchange with the drive unit DU. During driving of the drive unit DU (for example, when the vehicle V travels), the drive unit DU has a high temperature. With such a configuration, the drive unit DU is cooled down by the coolant C1, and the coolant C1 that receives heat from the drive unit DU is warmed. The coolant C1 that receives the heat from the drive unit DU can supply the heat to the heat pump circuit 31 via the first heat exchanger 50. That is, during heating of the vehicle compartment, the air conditioner 30 can also use the heat from the drive unit DU.

The battery temperature control circuit 40 may be connected to the temperature increase circuit 32 via an on-off valve. In this case, the vehicle compartment can be heated by the coolant C1 flowing through the battery temperature control circuit 40 and the temperature increase circuit 32 through the on-off valve without passing through the first heat exchanger 50.

The coolant in the battery temperature control circuit 40 may be different from the coolant in the temperature increase circuit 32.

The time t1 in FIG. 7 may be a time when the battery temperature is equal to or lower than a predetermined temperature (for example, the battery temperature is equal to or lower than 10° C.). The predetermined temperature at this time may be determined based on the effective capacity of the battery BAT.

In step S17 in FIG. 9, the control device CTR compares the predicted travel time with the battery-heat absorption expectation time, but the invention is not limited thereto, and comparison may be performed between a predicted heating time and the battery-heat absorption expectation time. At this time, in step S11, the control device CTR determines whether the predicted heating time is predictable, and in step S13, the control device CTR acquires the predicted heating time. For example, when pre-air conditioning is started before the vehicle V starts traveling, the predicted heating time and the battery-heat absorption expectation time are compared in step S17.

In the present description, at least the following matters are described. Although corresponding constituent elements or the like in the above-described embodiment are shown in parentheses, the present invention is not limited thereto.

(1) A heating control method for a vehicle (vehicle V) including a battery (battery BAT) and an air conditioner (air conditioner 30) that enables to heat a vehicle compartment, the vehicle being capable of traveling by electric power of the battery, in which an operation mode in which heating of the vehicle compartment is performed includes:
an outside-air-heat absorption mode in which the vehicle compartment is heated by absorbing heat from outside air without absorbing heat from the battery; and
a battery-heat absorption mode in which the vehicle compartment is heated by absorbing heat from at least the battery, the heating control method includes:
after an operation of the air conditioner is started in a state where the battery-heat absorption mode is selected, switching from the battery-heat absorption mode to the outside-air-heat absorption mode, or reducing an amount of heat absorbed from the battery in the battery-heat absorption mode, based on a predetermined condition.

According to (1), since the operation of the air conditioner is started in the state where the battery-heat absorption mode is selected, it is possible to perform heating by battery-heat absorption with high efficiency in a state where a battery temperature is relatively high, and an electricity cost of the vehicle is improved. On the other hand, by switching from the battery-heat absorption mode to the outside-air-heat absorption mode or reducing the amount of heat absorbed from the battery in the battery-heat absorption mode based on the predetermined condition, it is possible to prevent the heating in the battery-heat absorption mode from continuing when the battery temperature decreases to a certain extent. Thus, since a further decrease in the battery temperature is prevented, it is possible to prevent a decrease in an effective capacity of the battery, that is, it is possible to prevent a decrease in a cruising distance. Therefore, it is possible to achieve a balance between the electricity cost and the cruising distance of the vehicle.

(2) The heating control method for the vehicle according to (1),
in which when the operation of the air conditioner is started, the vehicle compartment is heated in the battery-heat absorption mode, and
the heating control method includes:
switching from the battery-heat absorption mode to the outside-air-heat absorption mode, or reducing the amount of heat absorbed from the battery in the battery-heat absorption mode, at a time (time t1, time t1') when a temperature decrease amount of the battery since the start of the operation of the air conditioner is equal to or larger than a predetermined temperature decrease amount.

According to (2), it is possible to appropriately control heat absorption from the battery based on the temperature decrease amount of the battery.

(3) The heating control method for the vehicle according to (2), in which
the predetermined temperature decrease amount is determined based on a decrease amount of an effective capacity of the battery due to a temperature decrease of the battery.

According to (3), it is possible to prevent an excessive decrease in the cruising distance of the vehicle caused by the decrease in the effective capacity of the battery due to the decrease in the battery temperature.

(4) The heating control method for the vehicle according to (1), including:
switching from the battery-heat absorption mode to the outside-air-heat absorption mode, or reducing the amount of heat absorbed from the battery in the battery-heat absorption mode, when a predetermined time elapses since the start of the operation of the air conditioner.

According to (4), it is possible to perform efficient heating by battery-heat absorption in an initial stage when the battery temperature is relatively high, and to prevent the heating in the battery-heat absorption mode from continuing in a state where the heating efficiency by battery-heat absorption deteriorates when the battery temperature is low after the initial stage.

(5) The heating control method for the vehicle according to any one of (1) to (4), further including:
- acquiring a predicted travel time of the vehicle or a predicted heating time of the air conditioner;
- predicting a first residual capacity (residual capacity E1) of the battery after a lapse of the predicted travel time or the predicted heating time in a case where the heating at least in the battery-heat absorption mode is performed during the predicted travel time or the predicted heating time;
- predicting a second residual capacity (residual capacity E2) of the battery after a lapse of the predicted travel time or the predicted heating time in a case where the heating in only the outside-air-heat absorption mode is performed during the predicted travel time or the predicted heating time; and
- heating the vehicle compartment in the outside-air-heat absorption mode since the start of the operation of the air conditioner, in a case where the second residual capacity is equal to or larger than the first residual capacity.

According to (5), it is possible to prioritize the residual capacity of the battery at the time of completion of travel or at the time of completion of heating.

What is claimed is:

1. A heating control method for a vehicle including a battery and an air conditioner that enables to heat a vehicle compartment, the vehicle being capable of traveling by electric power of the battery, including:
   - an outside-air-heat absorption mode in which the vehicle compartment is heated by absorbing heat from outside air without absorbing heat from the battery; and
   - a battery-heat absorption mode in which the vehicle compartment is heated by absorbing heat from at least the battery,
   - wherein the heating control method comprises:
     - heating the vehicle compartment in the battery-heat absorption mode when the operation of the air conditioner is started; and
     - after the battery-heat absorption mode is selected and an operation of the air conditioner is started, switching from the battery-heat absorption mode to the outside-air-heat absorption mode, or reducing an amount of heat absorbed from the battery in the battery-heat absorption mode, at a time when a temperature decrease amount of the battery since the start of the operation of the air conditioner is equal to or larger than a predetermined temperature decrease amount.

2. The heating control method for the vehicle according to claim 1, wherein the predetermined temperature decrease amount is determined based on a decrease amount of an effective capacity of the battery due to a temperature decrease of the battery.

3. A heating control method for the vehicle including a battery and an air conditioner that enables to heat a vehicle compartment, the vehicle being capable of traveling by electric power of the battery, including:
   - an outside-air-heat absorption mode in which the vehicle compartment is heated by absorbing heat from outside air without absorbing heat from the battery; and
   - a battery-heat absorption mode in which the vehicle compartment is heated by absorbing heat from at least the battery,
   - wherein the heating control method comprises:
     - after the battery-heat absorption mode is selected and an operation of the air conditioner is started, switching from the battery-heat absorption mode to the outside-air-heat absorption mode, or reducing the amount of heat absorbed from the battery in the battery-heat absorption mode, when a predetermined time elapses since the start of the operation of the air conditioner.

4. A heating control method for the vehicle including a battery and an air conditioner that enables to heat a vehicle compartment, the vehicle being capable of traveling by electric power of the battery, including:
   - an outside-air-heat absorption mode in which the vehicle compartment is heated by absorbing heat from outside air without absorbing heat from the battery; and
   - a battery-heat absorption mode in which the vehicle compartment is heated by absorbing heat from at least the battery,
   - wherein the heating control method comprises:
     - after the battery-heat absorption mode is selected and an operation of the air conditioner is started, switching from the battery-heat absorption mode to the outside-air-heat absorption mode, or reducing the amount of heat absorbed from the battery in the battery-heat absorption mode, based on a predetermined condition;
     - acquiring a predicted travel time of the vehicle or a predicted heating time of the air conditioner;
     - predicting a first residual capacity of the battery after a lapse of the predicted travel time or the predicted heating time in a case where at least the battery-heat absorption mode is performed during the predicted travel time or the predicted heating time;
     - predicting a second residual capacity of the battery after a lapse of the predicted travel time or the predicted heating time in a case where only the outside-air-heat absorption mode is performed during the predicted travel time or the predicted heating time; and
     - heating the vehicle compartment in the outside-air-heat absorption mode since the start of the operation of the air conditioner, in a case where the second residual capacity is equal to or larger than the first residual capacity.

* * * * *